United States Patent
Sorrell (10) Patent No.: US 12,340,958 B2
(45) Date of Patent: Jun. 24, 2025

(54) KEYBOARD-KEY BIASING DEVICE, SYSTEM AND METHOD

(71) Applicant: Solid Contracts Ltd., Poole (GB)

(72) Inventor: Anthony Sorrell, Poole (GB)

(73) Assignee: Solid Contracts Ltd., Poole (GB)

( * ) Notice: Subject to any disclaimer, the term of this patent is extended or adjusted under 35 U.S.C. 154(b) by 184 days.

(21) Appl. No.: 18/168,980

(22) Filed: Feb. 14, 2023

(65) Prior Publication Data

US 2023/0260723 A1    Aug. 17, 2023

(30) Foreign Application Priority Data

Feb. 15, 2022   (GB) ..................................... 2202000

(51) Int. Cl.
| | | |
|---|---|---|
| *H01H 13/70* | (2006.01) | |
| *G06F 1/16* | (2006.01) | |
| *H01H 13/20* | (2006.01) | |

(52) U.S. Cl.
CPC ........... *H01H 13/20* (2013.01); *G06F 1/1607* (2013.01); *H01H 13/70* (2013.01)

(58) Field of Classification Search
CPC ..... A63B 45/02; G06F 1/1607; G06F 3/0244; G06F 13/20; G09B 21/007; H01H 13/20; H01H 13/70
See application file for complete search history.

(56) References Cited

U.S. PATENT DOCUMENTS

2008/0257058 A1  10/2008  Chiu et al.
2021/0137270 A1*  5/2021  Holt .................... H04B 1/3877

FOREIGN PATENT DOCUMENTS

CN     209478231 U     10/2019
CN     112747201 A  *   5/2021

OTHER PUBLICATIONS

Corrected Search Report under Section 17 in counterpart British 1 Patent Application No. 2202000.2 dated Oct. 6, 2022.

* cited by examiner

*Primary Examiner* — Christopher E Mahoney
*Assistant Examiner* — Marissa Ferguson-Samreth
(74) *Attorney, Agent, or Firm* — Kim IP Law Group LLC (57) ABSTRACT

A keyboard-key biasing device 10 having a resiliently-flexible body element 12, a resiliently-flexible elongate first biasing member 14 which has a first contact area 30 and a resiliently-flexible elongate second biasing member 16 which has a second contact area 34. The first and second contact areas 30, 34 being at different distances from the body element 12 so that the biasing device 10 is usable in a plurality of orientations to suit a plurality of keyboard configurations.

20 Claims, 7 Drawing Sheets

KEYBOARD-KEY BIASING DEVICE, SYSTEM AND METHOD

The present invention relates to keyboard-key biasing device. The invention further relates to methods of depressing a key of a keyboard whilst a user is away from the keyboard.

Unified communications solutions, as well as other computer programs, running on a computer can monitor a user's computer activity. A common unified communications solution is Microsoft Teams®. When a user is inactive on the computer for a given duration, the unified communications solution may indicate this to other users. For example, indicating that the user has a status of "away". A user's activity over a period of time can be logged and reports of such logs can be generated.

For privacy reasons, a user may not wish for their activity to be monitored and logged. At least in some instances, it is not possible to disable this monitoring on the computer program.

With the rise of homeworking, unified communications solutions are increasingly being used by businesses, and this can result in an employee's activity being monitored by the employer or other colleagues. Such monitoring may result in a breach of an employee's human rights. For example, this may result in a breach of Article 8 of the Human Rights Act 1998 in the United Kingdom, or similar law in the United States.

Furthermore, a study of 53 daily Microsoft Teams® users in the United Kingdom identified that 77% of these workers occasionally or regularly return to their computer for the purpose of keeping their presence status active. The need to remain active on a collaborative communications platform appeals to both hard-working and less hard-working individuals.

Additionally, computers may have power-saving, security, or screen-saving features installed by default. Such features can result in the screen deactivating, the computer locking, and/or displaying a screen saver after a period of no computer activity. This may be inconvenient for a user, and a user may not be able to remove or deactivate these features.

It is therefore desirable to allow computer users, and in particular employee computer users, to maintain computer activity when away from the computer.

The present invention seeks to provide a solution to this problem.

According to a first aspect of the present invention, there is provided a keyboard-key biasing device comprising: a resiliently-flexible body element; a resiliently-flexible elongate first biasing member which extends from a first end portion of the body element and has a first contact area for depressing a keyboard key and/or engaging an underside of a keyboard; a resiliently-flexible elongate second biasing member which extends from a second end portion of the body element, which opposes the resiliently-flexible first biasing member, and which has a second contact area for depressing a keyboard key and/or engaging an underside of a keyboard; the first and second contact areas being at different distances from the body element so that the biasing device is usable in a plurality of orientations to suit a plurality of keyboard configurations.

Since the body element and biasing members are resilient, when they are opened and positioned around a keyboard, they close to provide a depressing force on an underlying key. Therefore, computer activity can be maintained, for the purposes of a unified communications solution, whilst the user is away from the keyboard. Since the first and second contact areas are at different distances from the body element, the biasing device can be used in at least two orientations to suit different keyboard configurations. In a first orientation, the first contact area contacts a key and the second contact area contacts the underside of the keyboard. This may suit a keyboard having a configuration wherein a key is at a large distance from an edge, if the first contact area is further from the body element than the second contact area. In a second orientation, the second contact area contacts a key and the first contact area contacts the underside of the keyboard. This may suit a keyboard having a configuration wherein a key is at a small or no distance from an edge, if the first contact area is further from the body element than the second contact area.

Therefore, the same device can be used for a large range of keyboard configurations.

Preferably, the first contact area may be at an end portion of the first biasing member, and the second contact area may be at an end portion of the second biasing member, each end portion having a width which is less than or equal to a width of a keyboard key. Therefore, the biasing members do not depress multiple keys unintentionally.

Advantageously, the first and second biasing members may be elongate, longitudinal extents thereof being non-parallel with each other so that at least one of the first and second biasing members extends towards the other of the first and second biasing members. Extending towards each other provides for a greater downward or normal force and/or greater grip on the key of the keyboard.

Beneficially, at least one of the first biasing member and second biasing member may be arcuate or substantially arcuate. An arc may allow for a greater downward or normal force on the keyboard, whilst preventing or limiting the presence of points on the biasing member, which may cause damage to a keyboard or computer if the biasing member is pressed into the computing equipment.

In a preferable embodiment, at least one of the first biasing member and second biasing member may be straight or substantially straight. Therefore, if a laptop computer screen is closed on the biasing member, the biasing member may present a flat surface to distribute compressive loads and prevent or limit screen damage.

Optionally one of the first biasing member and second biasing member may be arcuate or substantially arcuate and the other of the first biasing member and second biasing member may be straight or substantially straight.

Additionally, the first biasing member may be straight and the second biasing member may be arcuate, an end portion of the second biasing member extending at an angle to the first biasing member of between 30 degrees and 70 degrees when in a non-biasing condition. More preferably, the angle would be around 55 degrees. Such an angle may provide a suitable balance between providing a normal force on the keyboard, whilst still allowing for a thin profile to avoid computer equipment damage.

Preferably, at least one of the first and second biasing members may have a hinge portion configured to cause buckling and so height reduction thereof in response to a compressive load. This may be of particular relevance if said one of the first and second biasing members is arcuate. Therefore, the arc is flattened which may more evenly distribute forces on the keyboard and/or laptop screen.

Beneficially, the body element may include a portion having a greater thickness than that of the first biasing member and/or the second biasing member. The thicker portion may act as a bumper element to cushion forces on the biasing element if a laptop screen is closed thereon.

Advantageously, the body element may have a keyboard-facing surface which is at least in part concave for engaging a keyboard at a plurality of different edge-positions. The concave surface allows for the body element to move around the edge of the keyboard when under a compressive load, for example if a laptop screen is closed thereon. As such, a more planar surface of the biasing member can be presented to the laptop screen to more evenly distribute forces thereon and prevent or limit damage thereof.

In a preferable embodiment, the keyboard-facing surface may be curved for the keyboard-facing surface to slide around an edge of the keyboard. A curved, rather than a faceted arc, may more easily allow the keyboard-facing surface to move around the keyboard edge.

Optionally, the body element may have a hole therein.

Additionally, the biasing device may comprise a plurality of recesses.

Holes and/or recesses may provide material or weight saving for the device. Additionally or alternatively, the holes or recesses may provide for fine tuning of the rigidity of the relevant components.

Optionally, the device may comprise metal or plastics. If formed from metal, then the device may have a coating, such as a rubber or other elastomeric material, to cushion impacts on the device from computing equipment and mitigates the risk of scratching the keyboard keys.

According to a second aspect of the invention, there is provided a method of depressing a key of a keyboard whilst a user is away from the keyboard, the method comprising the steps of: a) providing a keyboard biasing device according to a first aspect of the invention; and b) positioning the keyboard biasing device so that one of the first and second contact areas contacts the key and the other of the first and second contact areas contacts an underside of the keyboard so as to depress the key.

According to a third aspect of the invention, there is provided a method of depressing a key on differently configured keyboards, the method comprising: a) providing a keyboard biasing device according to a first aspect of the invention; b) positioning the keyboard biasing device on a first keyboard having a first keyboard configuration so that the first contact area contacts a key of the first keyboard, and the second contact area contacts an underside of the first keyboard so as to depress the key; c) removing the keyboard biasing device from the first keyboard; and d) positioning the keyboard biasing device on a second keyboard having a second keyboard configuration so that the second contact area contacts a key of the second keyboard, and the first contact area contacts an underside of the second keyboard so as to depress the key.

According to a fourth aspect of the invention, there is provided a keyboard-key biasing system, comprising a keyboard and a keyboard-key biasing device according to a first aspect of the invention, the keyboard key biasing device positioned so that one of the first and second contact surfaces contacts a key of the keyboard, and the other of the first and second contact surfaces contacts an underside of the keyboard, so as to depress the key.

According to a fifth aspect of the invention, there is provided a keyboard-key biasing device comprising: a resiliently-flexible body element having a keyboard-facing surface which is at least in part concave for engaging a keyboard at a plurality of different edge-positions; a resiliently-flexible elongate first biasing member for depressing a keyboard key and/or engaging an underside of a keyboard, the first biasing member extending from a first end portion of the body element; a resiliently-flexible elongate second biasing member for depressing a keyboard key and/or engaging an underside of a keyboard, the second biasing member extending from a second end portion of the body element and opposing the resiliently-flexible first biasing member.

The concave surface allows for the body element to move around the edge of the keyboard when under a compressive load, for example if a laptop screen is closed thereon. As such, a more planar surface of the biasing member can be presented to the laptop screen to more evenly distribute forces thereon and prevent or limit damage thereof.

Preferably, the keyboard-facing surface may be curvate.

Advantageously, the first biasing member may be straight and the second biasing member may be arcuate, an end portion of the second biasing member extending at an angle to the first biasing member of between 30 degrees and 70 degrees when in a non-biasing condition.

Beneficially, one of the first and second biasing members may have a hinge portion configured to cause buckling and so height reduction thereof in response to a compressive load.

In a preferable embodiment, the body element may include a portion having a greater thickness than that of the first biasing member and/or the second biasing member.

Optionally, the first biasing member may have a first contact area for depressing a keyboard key and/or engaging an underside of a keyboard, and the second biasing member may have a second contact area for depressing a keyboard key and/or engaging an underside of a keyboard, the first and second contact areas being at different distances from the body element so that the biasing device is usable in a plurality of orientations to suit a plurality of keyboard configurations.

According to a sixth aspect of the invention, there is provided a method of preventing or limiting damage to a laptop computer having a screen element and a keyboard, the method comprising: providing a keyboard-key biasing device according to the fifth aspect of the invention; positioning the keyboard-key biasing device so that the first biasing member contacts the key of the keyboard, the second biasing member contacts an underside of the keyboard so as to depress the key, and the keyboard-facing surface engages the keyboard at a first edge-position; at least partially closing a laptop screen on the first biasing member so that the keyboard-key biasing device and the edge of the keyboard move relative to each other so that the keyboard at a second edge-position, the first biasing member having a lower profile when the keyboard-facing surface is in the second edge-position as compared to the first edge position.

According to a seventh aspect of the invention, there is provided a keyboard-key biasing device comprising: a shock-absorbing bumper element; a resiliently-flexible elongate first biasing member which extends from a first end portion of the bumper element; a resiliently-flexible elongate second biasing member which extends from a second end portion of the bumper element and which opposes the resiliently-flexible first biasing member; so that, when the keyboard-key biasing device is engaged at an edge of a laptop keyboard, one of the said first and second biasing members will retain a keyboard key in a depressed condition whilst the bumper element at least in part forms a shock-absorbing stop for a display screen in a substantially closed condition.

The bumper element may be compressible or deformable so as to act to absorb impact forces.

According to an eighth aspect of the invention, there is provided a keyboard-key biasing device comprising: a resiliently-flexible body element; a resiliently-flexible elongate first biasing member which extends from a first end portion of the body element; a resiliently-flexible elongate second biasing member which extends from a second end portion of the body element and which opposes the resiliently-flexible first biasing member; at least one of the first and second biasing members being inwardly, and preferably inwardly arcuate, oriented along at least part of its longitudinal extent.

According to a ninth aspect of the invention, there is provided a keyboard-key biasing device comprising: a resiliently-flexible body element; a resiliently-flexible elongate first biasing member which extends from a first end portion of the body element; a resiliently-flexible elongate second biasing member which extends from a second end portion of the body element and which opposes the resiliently-flexible first biasing member; the body element having a first rigidity, and at least one of the first and second biasing members having a second rigidity which is different to the said first rigidity, so that, when the keyboard-key biasing device is engaged at an edge of a laptop keyboard, one of the said first and second biasing members will retain a keyboard key in a depressed condition whilst the body element forms a shock-absorbing stop for a display screen in a substantially closed condition.

The different rigidities may be provided by differing thicknesses of material, or differing materials.

According to a tenth aspect of the invention, there is provided a keyboard-key biasing device comprising: a resiliently-flexible body element; a resiliently-flexible elongate first biasing member for depressing a keyboard key and/or engaging an underside of a keyboard, the first biasing member extending from a first end portion of the body element; a resiliently-flexible elongate second biasing member for depressing a keyboard key and/or engaging an underside of a keyboard, the second biasing member extending from a second end portion of the body element and opposing the resiliently-flexible first biasing member; the second biasing member having a, preferably living, hinge portion configured to cause buckling of the second biasing member when compressed, preferably by a laptop screen, so that a height of the second biasing member and/or of the keyboard-key biasing device is adjustable.

The invention will now be more particularly described, by way of example only, with reference to the accompanying drawings, in which.

Referring firstly to FIGS. 1 to 6, there is shown a keyboard-key biasing device 10 which has a body element 12, or shock absorbing bumper element, a first biasing member 14, and a second biasing member 16. The first and second biasing members 14, 16 oppose each other, a space therebetween for receiving a keyboard.

The body element 12 can be considered to have a first end portion 18 and a second end portion 20, the first biasing member 14 extending from the first end portion 18, and the second biasing member 16 extending from the second end portion 20.

The body element 12 is preferably resiliently flexible. In other words, when the body element 12 is deformed by a force, it would revert to its previous undeformed state when said force is removed. A material such as metal, for example steel, or plastics may be considered.

Between the first end portion 18 and the second end portion 20, the body element 12 preferably has a generally arcuate state. Here the arcuate shape is curved, However, it will be appreciated that the body element 12 may instead have straight facets, for example.

There is preferably a central hole 22 in the body element 12, having a rib 24 extending either side. A flap 26 extends from an edge of the central hole 22, and extends inwards or inside of a general arc of the body element 12. The flap 26 may engage or be attached to an opposing side of the body element 12.

The body element 12 may have a thicker portion 28 at or adjacent to the first end portion 18. The thicker portion 28 may act as a bumper, shock absorber, or cushioning element.

The first biasing member 14 has a first contact area 30 for depressing a keyboard key in a first orientation and for engaging an underside of a keyboard in a second orientation. The first contact area 30 is preferably at or adjacent to a free end of the first biasing member 14.

The first contact area 30 may include the end face of the first biasing member 14. To assist with contacting a keyboard when in different positions or orientations with respect thereto, an edge between the end face and an inside face of the first biasing member 14 may have a bevelled or curved profile.

A free end portion of the first biasing member 14 preferably has a width which is less than that of a typical key of a keyboard. The first biasing member 14 preferably has a substantially uniform width, although in FIG. 2 it can be seen that the width gradually increases towards the free end.

Figure 1:
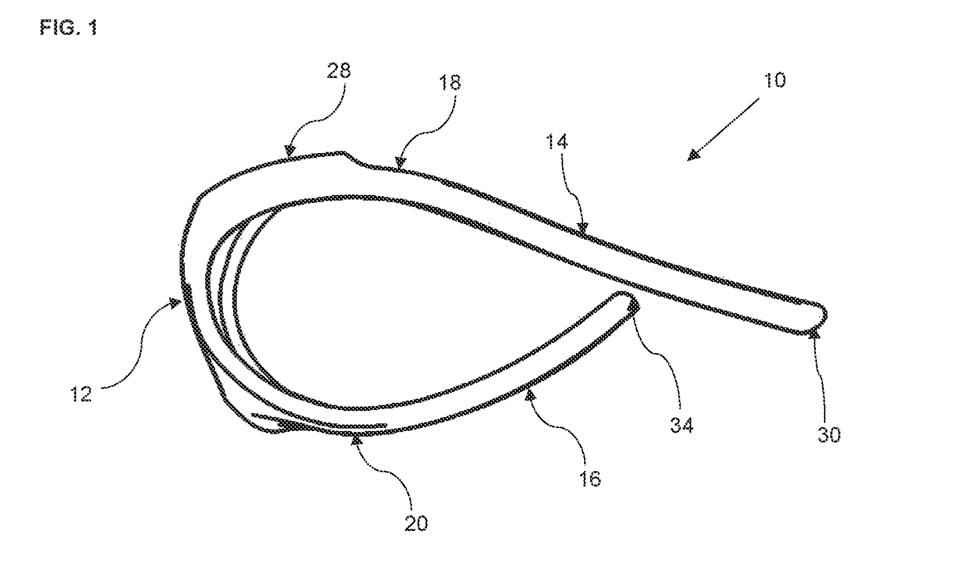
FIG. 1 shows a side view of an embodiment of a keyboard-key biasing device in accordance with the first, fifth, seventh, eighth, ninth, and tenth aspects of the invention, in a closed condition.
Figure 2:
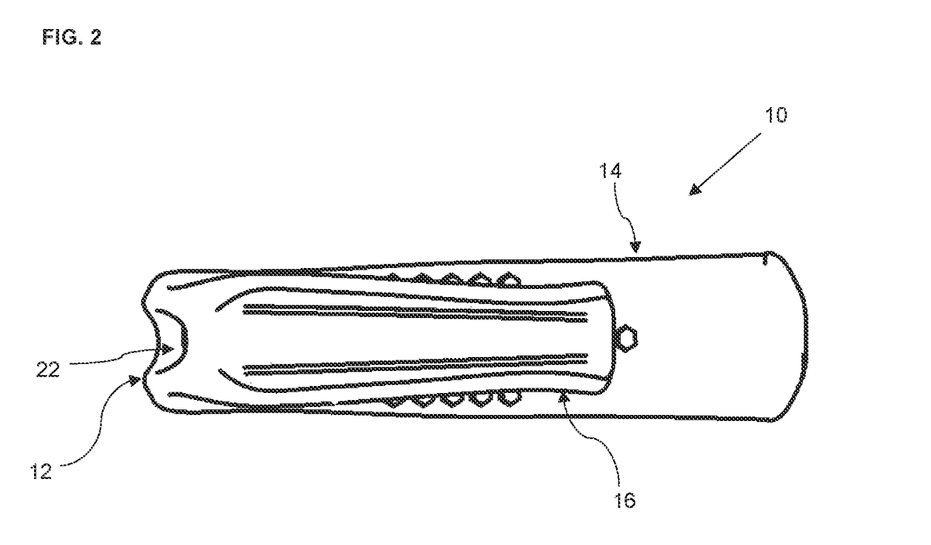
FIG. 2 shows a top or bottom view of the keyboard-key biasing device of FIG. 1.
Figure 3:
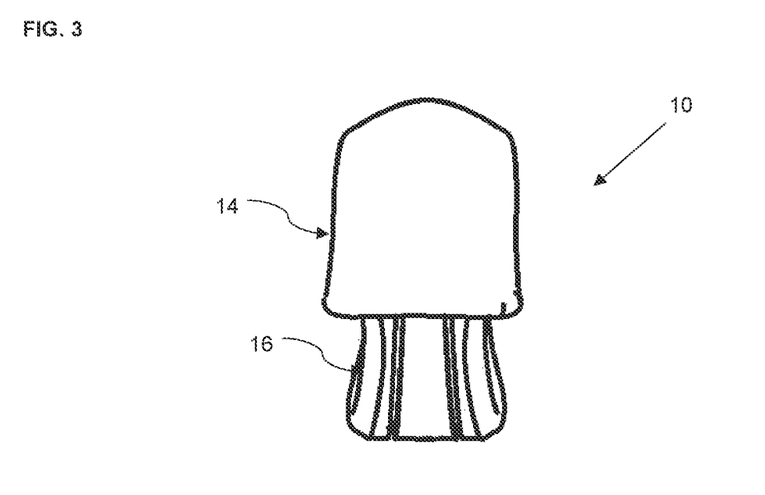
FIG. 3 shows a front view of the keyboard-key biasing device of FIG. 1.
Figure 4:
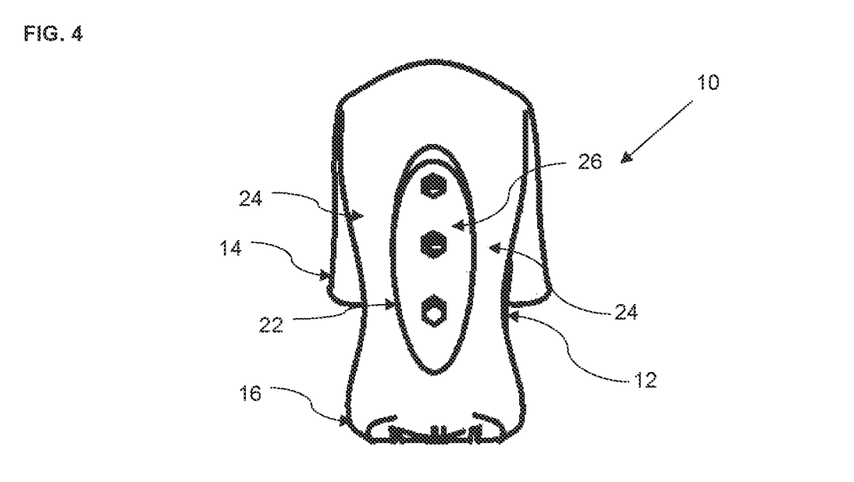
FIG. 4 shows a rear view of the keyboard-key biasing device of FIG. 1.
Figure 5:
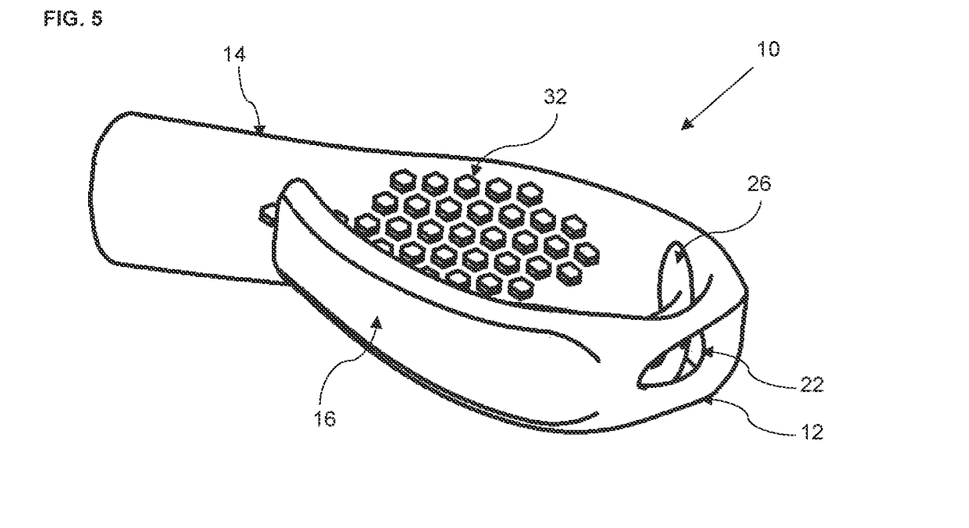
FIG. 5 shows a first perspective view of the keyboard-key biasing device of FIG. 1.
Figure 6:
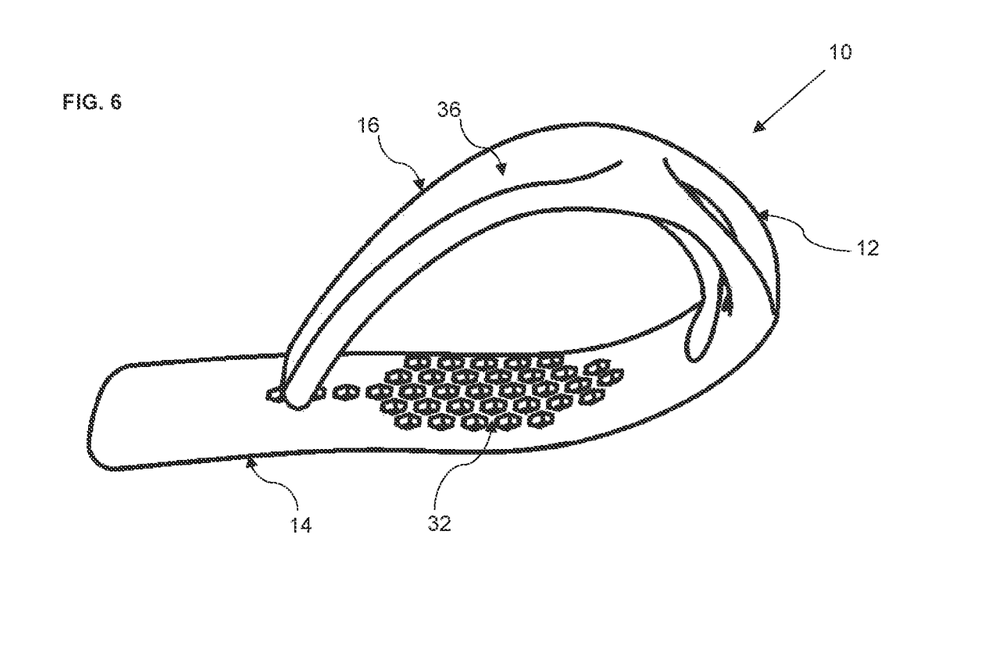
FIG. 6 shows a second perspective view of the keyboard-key biasing device of FIG. 1.

The first biasing member 14 is elongate and a longitudinal extent thereof is preferably straight or substantially straight, as shown in FIG. 1. However, it will be appreciated that alternatively it may be arcuate or curved in a longitudinal direction.

There are preferably a plurality of holes 32 or recesses in an inside face of the first biasing member 14. The holes 32 may provide material or weight saving, and/or may increase a flexibility of the first biasing member 14. The holes 32 are preferably in a honeycomb-like or close-packing arrangement.

The second biasing member 16 has a second contact area 34 for depressing a keyboard key in a second orientation and for engaging an underside of a keyboard in a first orientation. The second contact area 34 is preferably at or adjacent to a free end of the first biasing member 14.

A free end portion of the second biasing member 16 preferably has a width which is less than that of a typical key of a keyboard. The second biasing member 16 preferably has a waisted central portion, although it will be appreciated that other shapes may be considered.

The second biasing member 16 is elongate and a longitudinal extent thereof is preferably arcuate or substantially arcuate and/or curved or substantially curved, as shown in FIG. 1. The arc is in an inward direction, in other words the second biasing member 16 extends in an arc towards the first biasing member 14. However, it will be appreciated that alternatively the first biasing member 14 may be straight or substantially straight. In the case that both the first and second biasing members 14, 16 have a straight longitudinal extent, preferably the biasing members are angled to extend towards each other.

The second biasing member 16 extends towards the first biasing member 14. In a relaxed or at-rest condition, as shown in FIG. 1, an angle between the end portion of the second member and the first member may be between 30 degrees and 70 degrees, and more preferably is 55 degrees or substantially 55 degrees.

The second biasing member 16 may have a groove 36 or recess along an outside surface thereof. This serves to reduce the thickness of the second biasing member 16 whilst maintaining rigidity. It will be appreciated that the groove may not be included, or may have a different shape if desired. For example, a groove with six sides may be considered.

The second contact area 34 is at shorter distance from the body element 12 than the first contact area 30 is. This is due to the second biasing member 16 being shorter than the first biasing member 14, and due to the curve of the second biasing member 16.

The body element 12 may have a greater thickness of material and so a greater rigidity than the first biasing member 14 and/or the second biasing member 16. Additionally, or alternatively, the greater thickness of material may provide a greater cushioning effect.

In use, the keyboard-key biasing device 10 depresses a key of a keyboard of a computer, whilst the computer is turned on and a user is away from the keyboard and computer. As such, monitoring software registers computer activity, and does not indicate or record that a user is "away" from the computer. The device 10 can then be removed when a user returns, or may feasibly left in place if desired.

Figure 7:
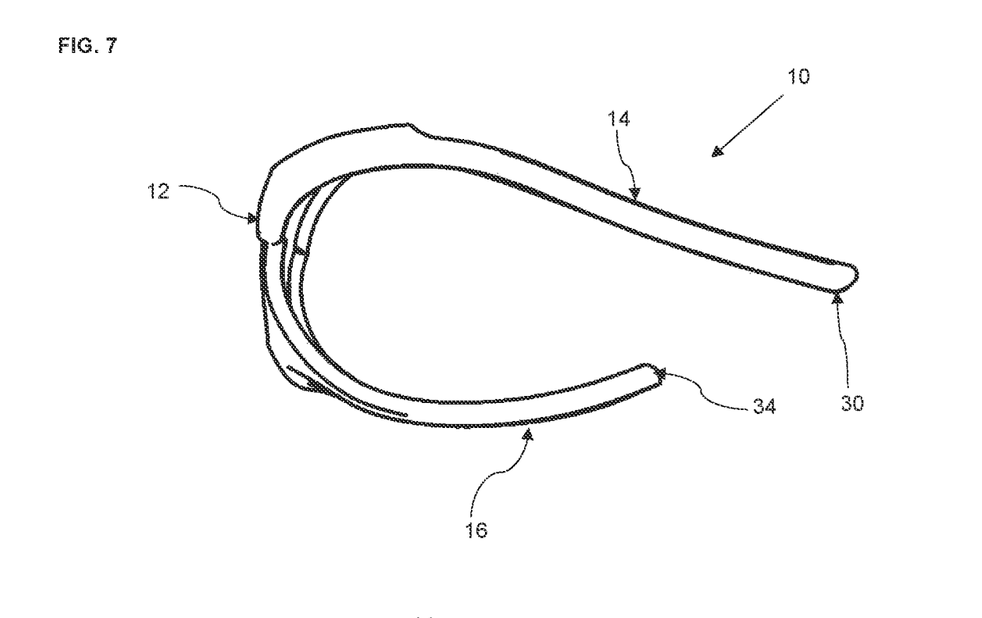
FIG. 7 shows a side view of the keyboard-key biasing device of FIG. 1 in an open condition.
Figure 8:
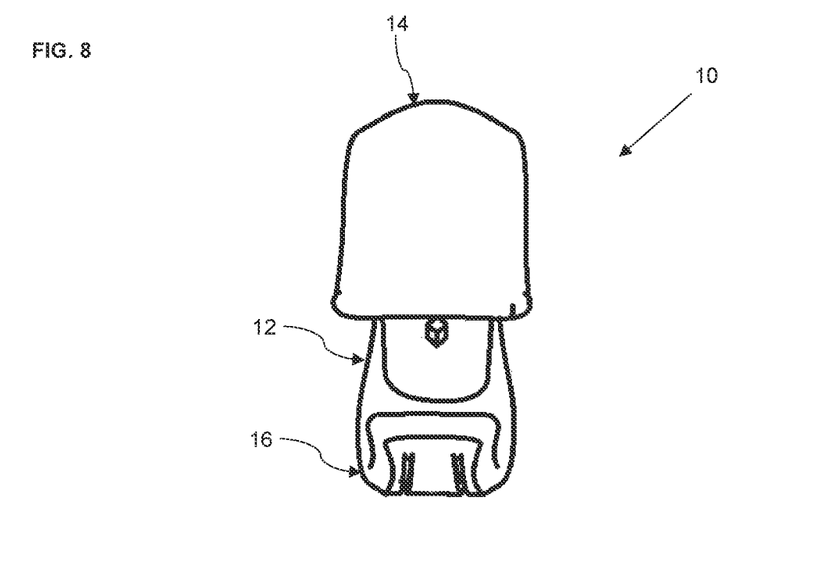
FIG. 8 shows a front view of the keyboard-key biasing device of FIG. 5.

To use the keyboard-key biasing device 10, the first and second biasing members 14, 16 are moved away or separated from each so that the device 10 is "open" and there is a space or gap between the end portions of the arm which is at least equal to a width of a keyboard. The keyboard-key biasing device 10 in an open condition can be seen in FIGS. 7 and 8; however, for different keyboard thicknesses, the first and second biasing members 14, 16 may need to be separated by different amounts.

Figure 9:
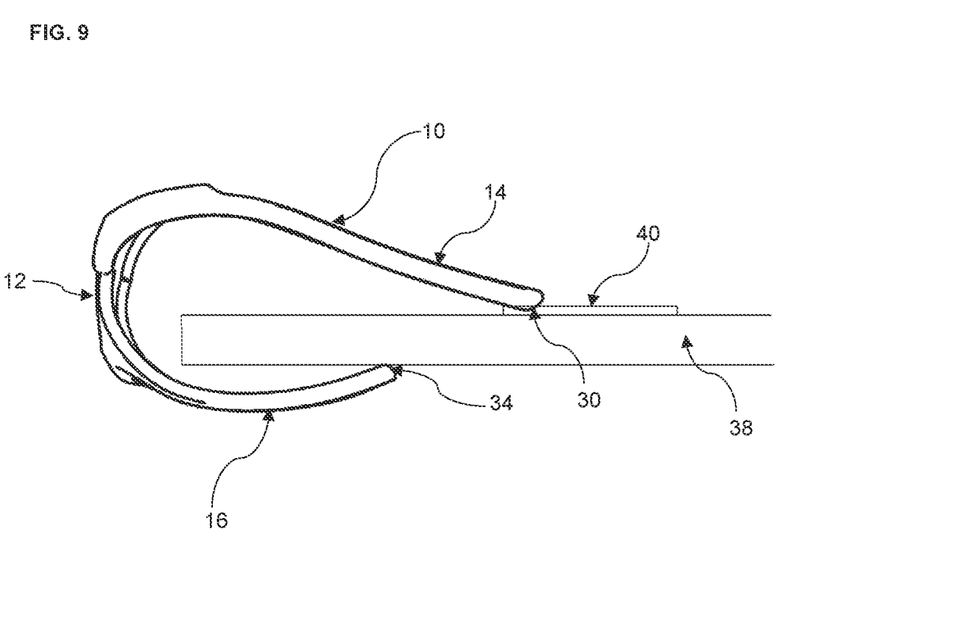
FIG. 9 shows a side view of the keyboard-key biasing device of FIG. 5 in a first orientation on a first keyboard having a first configuration.

The keyboard-key biasing device 10 is then positioned on, at or adjacent to an edge of the keyboard. The arc of the body element 12 may extend around or receive the edge of the keyboard. A first orientation of the keyboard-key biasing device 10 on a first keyboard 38 having a first keyboard configuration and depressing a first key 40 is shown in FIG. 9. The first keyboard configuration has a large distance between the edge of the first keyboard 38 and the first key 40, for example around 50 mm.

Here, the first contact area 30 is positioned at the first key 40 of the first keyboard 38, and the second contact area 34 is positioned at an underside of the first keyboard 38. Due to the resilience of the device 10, the first and second biasing members 14, 16 are biased to close the gap between them. This exerts a pressing force on the keyboard and the first key 40 is depressed. The first biasing member 14 extends downwards towards the keyboard to provide a downwards force on the first key 40.

The key which is selected to be depressed for maintaining activity is preferably a key which does not interfere with files which may be open on the computer, and which is close to the edge of the keyboard. For example, the "Caps Lock" key may be selected to be depressed.

Figure 10:
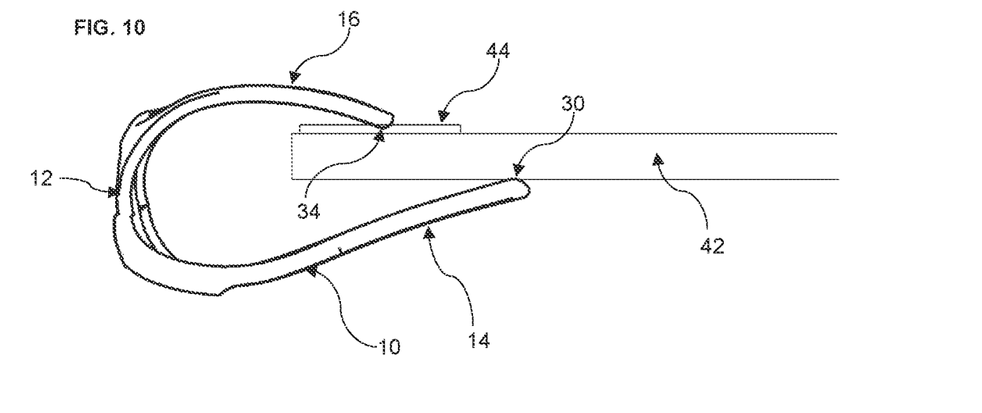
FIG. 10 shows a side view of the keyboard-key biasing device of FIG. 5 in a second orientation on a second keyboard having a second configuration.

Referring now to FIG. 10, a second orientation of the keyboard-key biasing device 10 on a second keyboard 42 having a second keyboard configuration and depressing a second key 44 is shown. The second keyboard configuration has a small distance between the edge of the second keyboard 42 and the second key 44, for example 1 mm.

Therefore, as shown in FIGS. 9 and 10, the keyboard-key biasing device 10 can be used in at least two orientations to suit different keyboards having different keyboard configurations.

Referring now to FIGS. 11a to 11d, the keyboard-key biasing device 10 preferably is configured to avoid damage to a screen 46, if the keyboard-key biasing device 10 is used on a keyboard which is part of a laptop computer 48. A laptop computer 48 will be understood to be a computer which has a laptop keyboard 50 and a screen 46 which are hingably or pivotably connected, so that the screen 46 closes on top of the laptop keyboard 50.

Figure 11A:
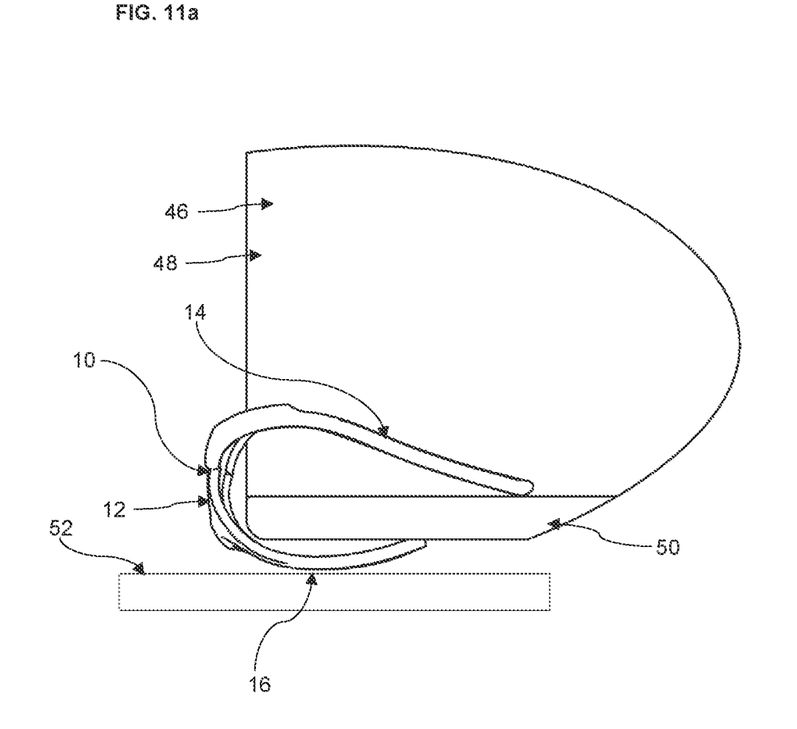
FIG. 11a shows a side view of the keyboard-key biasing device of FIG. 5 in the first orientation and not under a compressive load.

FIG. 11a shows the keyboard-key biasing device 10 on the laptop keyboard 50, with the laptop "open", in other words the screen 46 upright and approximately perpendicular to the laptop keyboard 50. The keyboard-key biasing device 10 is in use pressing a key of the laptop keyboard 50, and is in the first orientation, and in a first edge-position, with the edge of the laptop keyboard 50 closer to the second end portion 20 of the body element 12 than to the first end portion 18. In other words, the edge of the laptop keyboard 50 is at or adjacent to a lower portion of the body element 12. A surface 52, such as a desk or table is at the outer surface of the second biasing member 16.

Figure 11B:
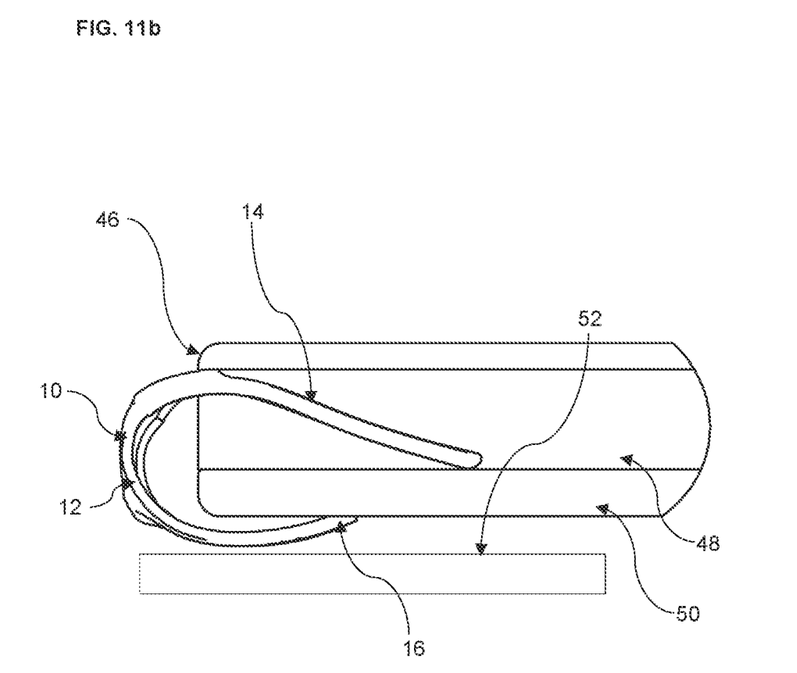
FIG. 11b shows the keyboard-key biasing device of FIG. 11a with a screen of a laptop computer partially closed and engaging the keyboard-key biasing device.

As shown in FIG. 11b, the laptop screen 46 may be closed towards the keyboard 50 and onto the first biasing member 14.

Figure 11C:
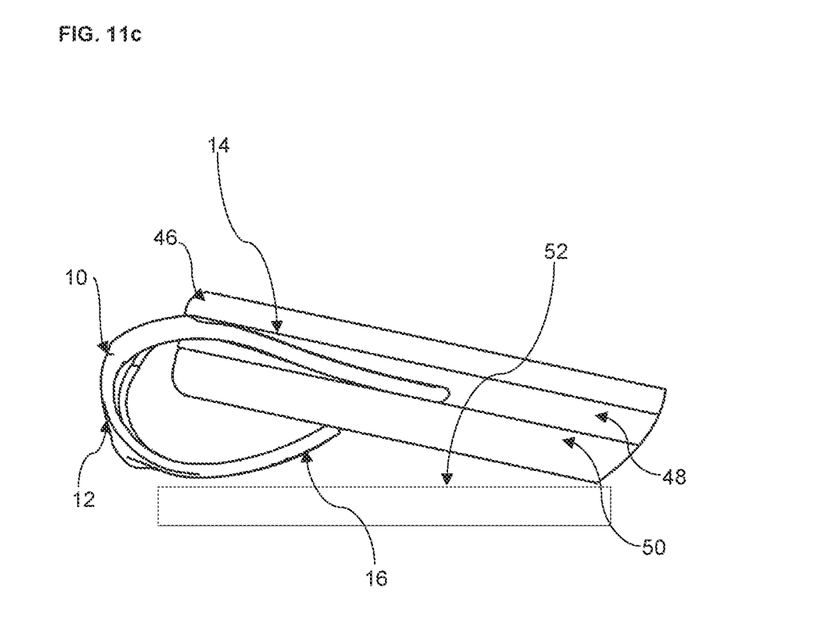
FIG. 11c shows the keyboard-key biasing device of FIG. 11b with the screen further closed so that the keyboard is lifted up and/or supported by the keyboard-key biasing device.

As shown in FIG. 11c, when the laptop screen 46 is closed still further, the body element 12 is sufficiently rigid and/or strong to resist compression and lift, raise, support or suspend the keyboard 50 above the surface 52. The laptop screen 46 engages the first biasing member 14, and is prevented from being moved further downwardly. Therefore, instead of the laptop screen 46 closing further to the keyboard 50, the keyboard 50 lifts upwards. As such, the edge of the keyboard 50 moves around the concave keyboard-engaging surface of the body element 12, and is in a second edge position. Since only one edge of the laptop 48 is raised, the laptop 48 is shown at an angle to the surface 52.

The second-edge position may present a flatter surface to a face of the screen 46 since the first biasing member 14 is parallel or substantially parallel to the keyboard surface and/or to the screen 46 in the closed condition. This distributes any force being applied to the screen 46, and thereby prevents or limits damage of the screen 46.

It will be appreciated that if the keyboard-key biasing device 10 is used in the second orientation, a similar or identical movement of the device 10 around the edge of the screen 46 may occur under a compressive load, similarly or identically distributing force and preventing or limiting damage to the screen 46.

Figure 11D:
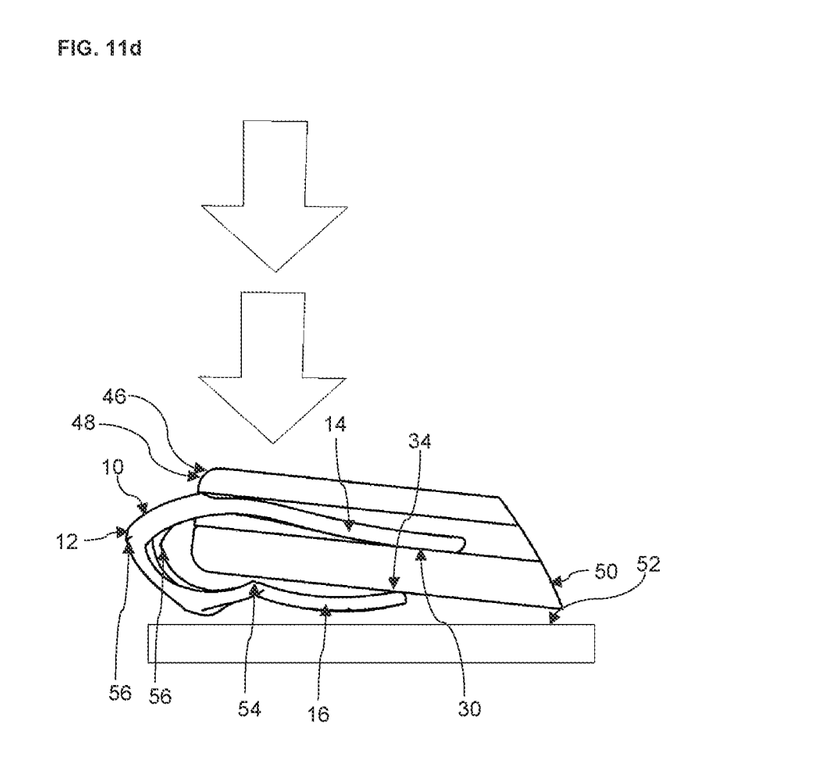
FIG. 11d shows the keyboard-key biasing device of FIG. 11a, under a high compressive load indicated by two block arrows.

As shown in FIG. 11d, if a greater compressive force is applied on the first biasing member 14, then the resistance of the keyboard-key biasing device 10 may be overcome and the second biasing member 16 may buckle or hinge at a hinging point 54, flattening or inflecting the arc. The body element 12 may also buckle or hinge at one or more hinging points 56. This buckling or hinging may be at a living hinge, and as such there is no mechanical hinge present. Alternatively, a mechanical hinge or pivot may be incorporated.

Such an arrangement may prevent damage occurring to the laptop, since the profile of the keyboard-key biasing device 10 is flattened and so forces are distributed.

It will be appreciated that if the keyboard-key biasing device 10 is used in the second orientation then the first biasing member 14 may similarly buckle.

The keyboard-key biasing device may also be used to cover a camera lens for privacy purposes. As such, it may be received an edge of a laptop screen having an integral camera, the first or second biasing members covering the lens of the camera. The aforementioned features preventing damage of the screen may also be useful in this application.

If formed from plastics, the keyboard-key biasing device may be formed via additive manufacture, injection moulding, or other forms of plastic manufacture. If formed from metal, the keyboard-key biasing device may be formed via bending of an appropriately machined workpiece, or other forms of metal manufacture.

Although the biasing members and body element are described as being resiliently flexible, it will be appreciated that this may not necessarily be the case. For example, the biasing members and may be rigid, and a separate resilient element, such as a spring, may be used to bias the two members together. In this case, the body element may be replaced as a hinging or pivoting point.

It is therefore possible to provide a keyboard-key biasing device for depressing a key of a keyboard whilst a user is away from the computer. The device has two arms having a different length and so the device can be used in two different orientations which allows use with differently laid out keyboards. A bridging portion between the two arms is arced, and so can move around the edge of a keyboard to reduce stress on a laptop screen if a laptop screen is closed thereon. At least one of the arms has a hinge so as to promote buckling thereof in case of large stress, to prevent damage to a laptop computer, for example.

The words 'comprises/comprising' and the words 'having/including' when used herein with reference to the present invention are used to specify the presence of stated features, integers, steps or components, but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of examples only, and various other modifications will be apparent to persons skilled in the field without departing from the scope of the invention as defined herein.

The invention claimed is:

1. A keyboard-key biasing device comprising:
a resiliently-flexible body element;
a resiliently-flexible elongate first biasing member which extends from a first end portion of the body element and has a first contact area;
a resiliently-flexible elongate second biasing member which extends from a second end portion of the body element, which opposes the resiliently-flexible first biasing member, and which has a second contact area;
the first and second contact areas being at different distances from the body element to each other so that the biasing device is configured to be used in a plurality of orientations to suit a plurality of keyboard configurations, the keyboard-key biasing
device configured so that one of the first and second contact areas depresses a keyboard key whilst the other of the first and second contact areas engages an underside of a keyboard.

2. The keyboard-key biasing device as claimed in claim 1, wherein the first and second biasing members are elongate, longitudinal extents thereof being non-parallel with each other so that at least one of the first and second biasing members extends towards the other of the first and second biasing members.

3. The keyboard-key biasing device as claimed in claim 1, wherein at least one of the first biasing member and second biasing member is any one of arcuate and substantially arcuate.

4. The keyboard-key biasing device as claimed in claim 1, wherein at least one of the first biasing member and second biasing member is any one of straight and substantially straight.

5. The keyboard-key biasing device as claimed in claim 1, wherein one of the first biasing member and second biasing member is any one of arcuate and substantially arcuate and the other of the first biasing member and second biasing member is any one of straight and substantially straight.

6. The keyboard-key biasing device as claimed in claim 5, wherein the first biasing member is straight and the second biasing member is arcuate, an end portion of the second biasing member extending at an angle to the first biasing member of between 30 degrees and 70 degrees when in a non-biasing condition.

7. The keyboard-key biasing device as claimed in claim 1, wherein the body element includes a portion having a greater thickness than that of at least any one of the first biasing member and the second biasing member.

8. The keyboard-key biasing device as claimed in claim 1, wherein the body element has a keyboard-facing surface which is at least in part concave so that the keyboard-facing surface is configured to engage a keyboard at a plurality of different edge-positions.

9. The keyboard-key biasing device as claimed in claim 8, wherein the keyboard-facing surface is curved so that the keyboard-facing surface is configured to slide around an edge of the keyboard.

10. The keyboard-key biasing device as claimed in claim 1, wherein the body element has a hole therein.

11. The keyboard-key biasing device as claimed in claim 1, further comprising a plurality of recesses.

12. The keyboard-key biasing device as claimed in claim 1, wherein the device comprises metal or plastics.

13. The keyboard-key biasing device as claimed in claim 1, wherein at least one of the first biasing member and second biasing member has an arcuate portion, and wherein a hinge portion is at the arcuate portion and is configured to cause buckling thereof in response to a compressive load.

14. The keyboard-key biasing device as claimed in claim 1, wherein the first contact area is at an end portion of the first biasing member, and the second contact area is at an end portion of the second biasing member, neither the first nor second contact areas having a dimension which is greater than a width of a typical key of a keyboard.

15. A method of depressing a key of a keyboard whilst a user is away from the keyboard, the method comprising the steps of:
   a) providing a keyboard biasing device as claimed in claim 1; and
   b) positioning the keyboard biasing device so that one of the first and second contact areas contacts the key and the other of the first and second contact areas contacts an underside of the keyboard so as to depress the key.

16. A method of depressing a key on differently configured keyboards, the method comprising:
   a) providing a keyboard biasing device as claimed in claim 1;
   b) positioning the keyboard biasing device on a first keyboard having a first keyboard configuration so that the first contact area contacts a key of the first keyboard, and the second contact area contacts an underside of the first keyboard so as to depress the key;
   c) removing the keyboard biasing device from the first keyboard; and
   d) positioning the keyboard biasing device on a second keyboard having a second keyboard configuration so that the second contact area contacts a key of the second keyboard, and the first contact area contacts an underside of the second keyboard so as to depress the key.

17. A keyboard-key biasing system, comprising a keyboard and a keyboard-key biasing device, the keyboard-key biasing device comprising:
   a resiliently-flexible body element;
   a resiliently-flexible elongate first biasing member which extends from a first end portion of the body element and has a first contact area configured to at least any one of depress a keyboard key and engage an underside of a keyboard;
   a resiliently-flexible elongate second biasing member which extends from a second end portion of the body element, which opposes the resiliently-flexible first biasing member, and which has a second contact area configured to at least any one of depress a keyboard key and/or engage an underside of a keyboard;
   the first and second contact areas being at different distances from the body element to each other so that the biasing device is configured to be used in a plurality of orientations to suit a plurality of keyboard configurations,
   the keyboard key biasing device positioned so that one of the first and second contact surfaces contacts a key of the keyboard, and the other of the first and second contact surfaces contacts an underside of the keyboard, so as to depress the key.

18. A keyboard-key biasing device comprising:
   a resiliently-flexible body element having a keyboard-facing surface which is at least in part concave so that the keyboard-facing surface is configured to engage a keyboard at a plurality of different edge-positions;
   a resiliently-flexible elongate first biasing member, the first biasing member extending from a first end portion of the body element;
   a resiliently-flexible elongate second biasing member, the second biasing member extending from a second end portion of the body element and opposing the resiliently-flexible first biasing member,
   the keyboard-key biasing device configured so that one of the first and second biasing members depresses a keyboard key whilst the other of the first and second biasing members engages an underside of a keyboard.

19. The keyboard-key biasing device as claimed in claim 18, wherein one of the first and second biasing members has a hinge portion configured to cause buckling and so height reduction thereof in response to a compressive load.

20. A method of preventing or limiting damage to a laptop computer having a screen element and a keyboard, the method comprising:
   a) providing a keyboard-key biasing device as claimed in claim 18;
   b) positioning the keyboard-key biasing device so that the first biasing member contacts the key of the keyboard, the second biasing member contacts an underside of the keyboard so as to depress the key, and the keyboard-facing surface engages the keyboard at a first edge-position;
   c) at least partially closing a laptop screen on the first biasing member so that the keyboard-key biasing device and the edge of the keyboard move relative to each other so that the keyboard-facing surface engages the keyboard at a second edge-position, the first biasing member having a lower profile when the keyboard-facing surface is in the second edge-position as compared to the first edge position.

* * * * *